May 22, 1945. W. J. MILLER 2,376,800
APPARATUS FOR MANUFACTURING POTTERYWARE
Filed Jan. 13, 1944 10 Sheets-Sheet 1

INVENTOR.
William J. Miller.
BY George J. Creninger
ATTORNEY.

May 22, 1945.  W. J. MILLER  2,376,800
APPARATUS FOR MANUFACTURING POTTERYWARE
Filed Jan. 13, 1944  10 Sheets-Sheet 2

INVENTOR.
William J. Miller
george J. Croninger
ATTORNEY.

May 22, 1945.   W. J. MILLER   2,376,800
APPARATUS FOR MANUFACTURING POTTERYWARE
Filed Jan. 13, 1944   10 Sheets-Sheet 3

INVENTOR.
William J. Miller.
BY
george J. Cominger
ATTORNEY.

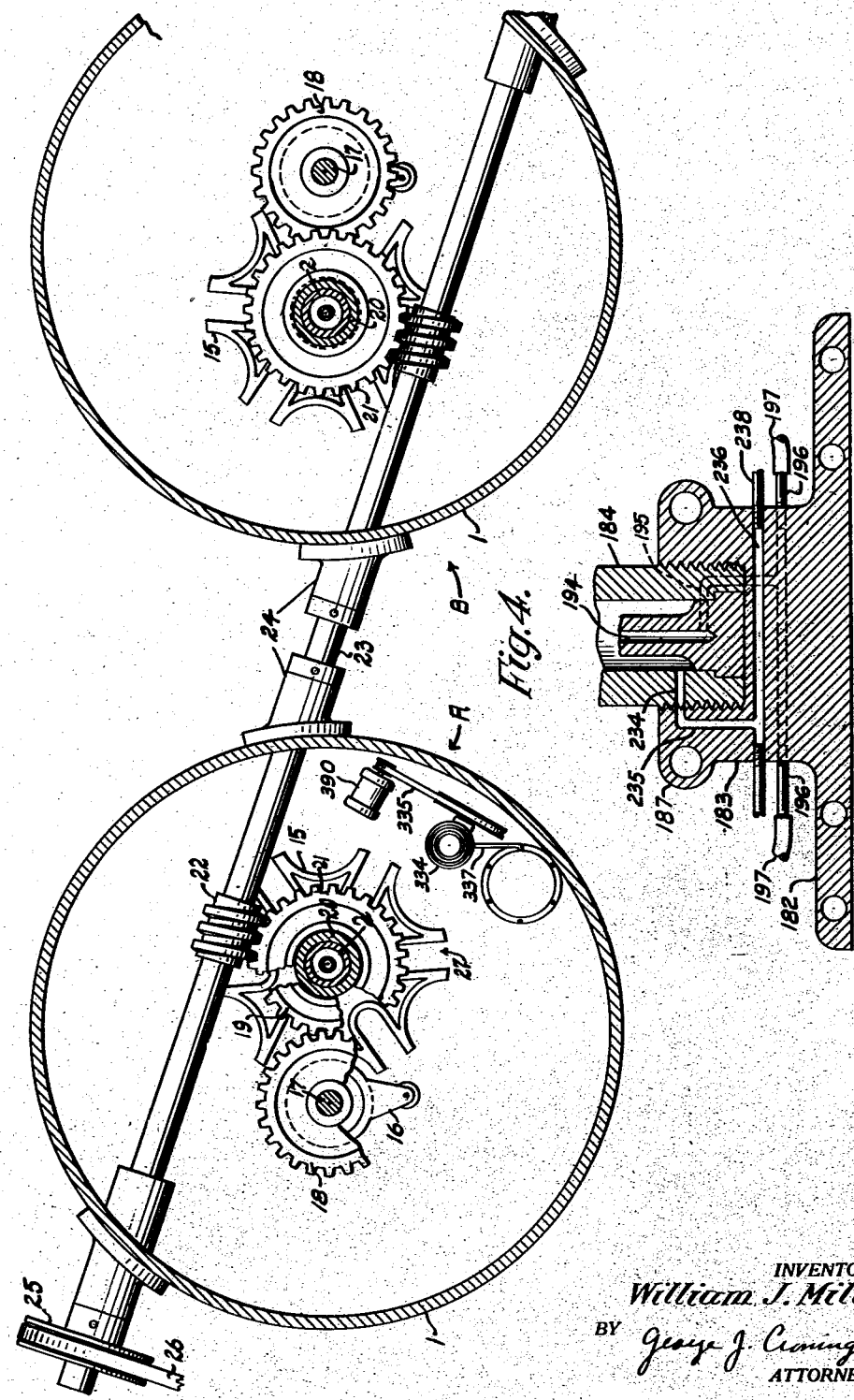

May 22, 1945. W. J. MILLER 2,376,800
APPARATUS FOR MANUFACTURING POTTERYWARE
Filed Jan. 13, 1944 10 Sheets-Sheet 5
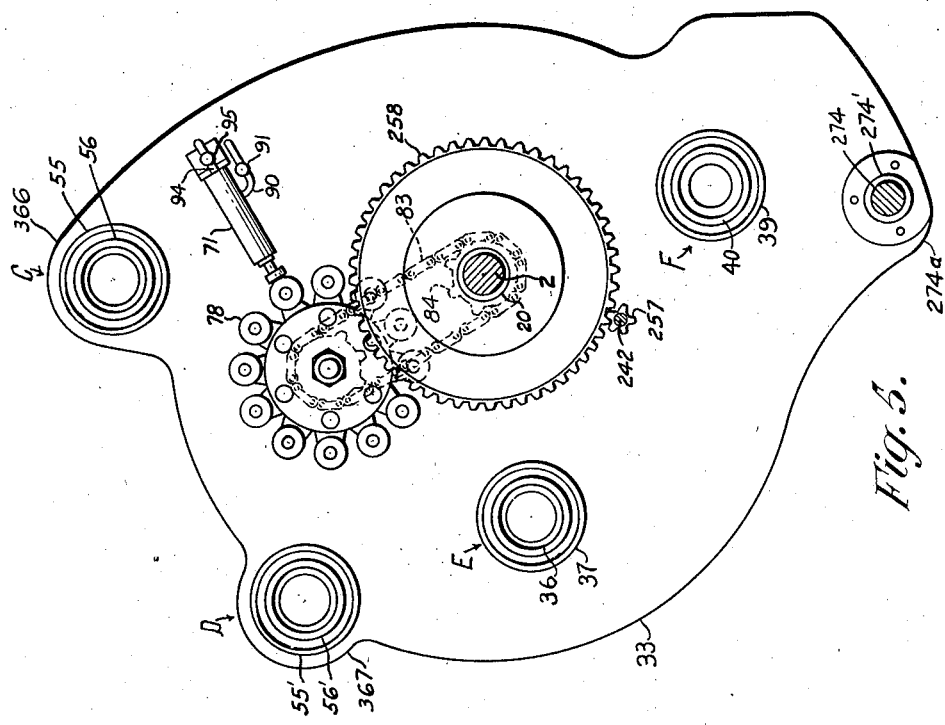
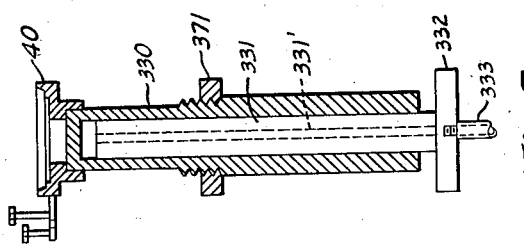
INVENTOR.
William J. Miller.
BY
George J. Croninger
ATTORNEY.

May 22, 1945. W. J. MILLER 2,376,800
APPARATUS FOR MANUFACTURING POTTERYWARE
Filed Jan. 13, 1944 10 Sheets-Sheet 6

INVENTOR.
William J. Miller.
BY George J. Croninger
ATTORNEY.

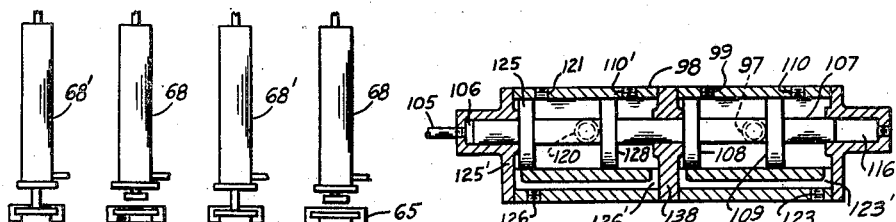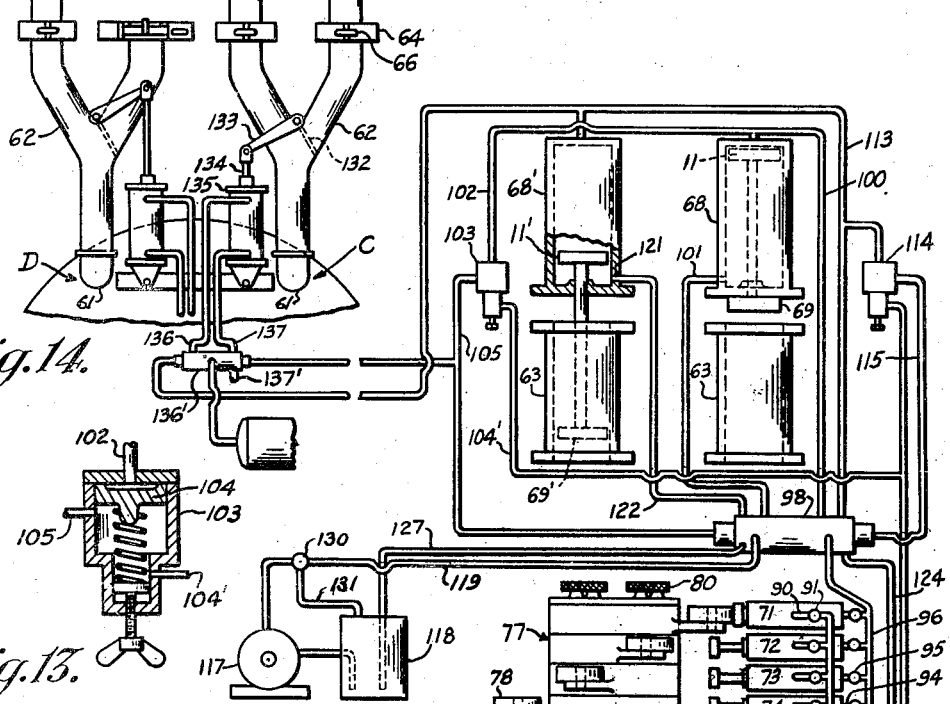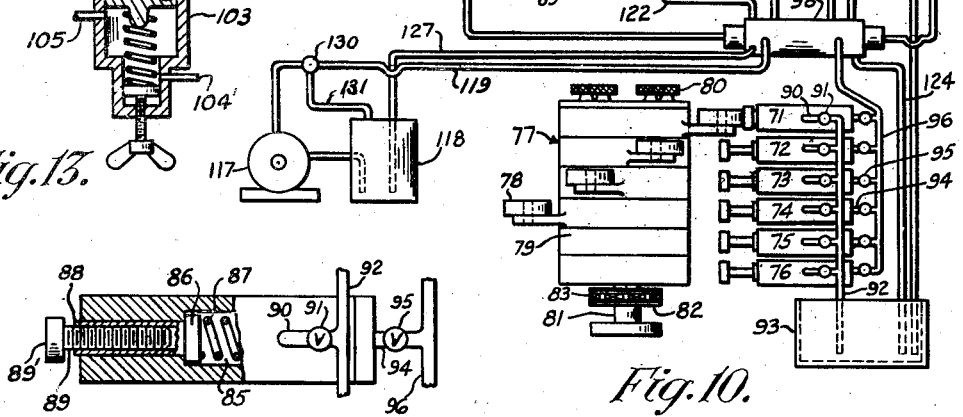

May 22, 1945.  W. J. MILLER  2,376,800
APPARATUS FOR MANUFACTURING POTTERYWARE
Filed Jan. 13, 1944    10 Sheets-Sheet 8

INVENTOR.
William J. Miller.
BY George J. Croninger
ATTORNEY.

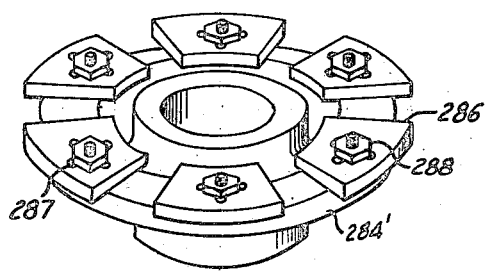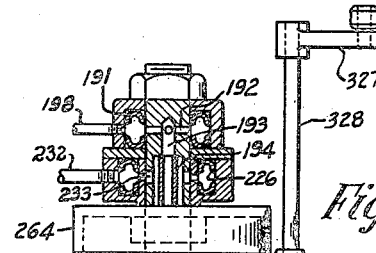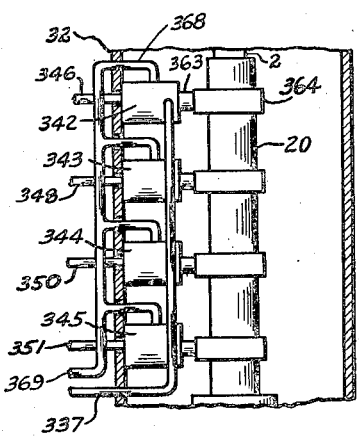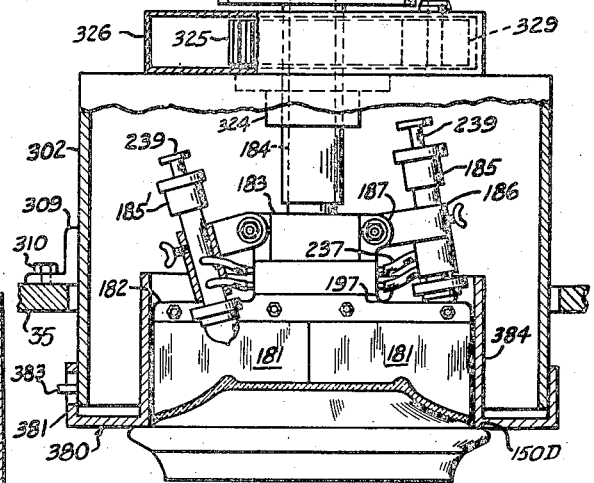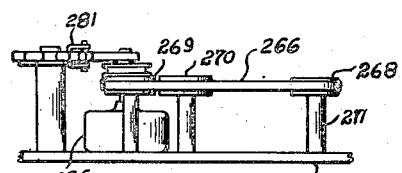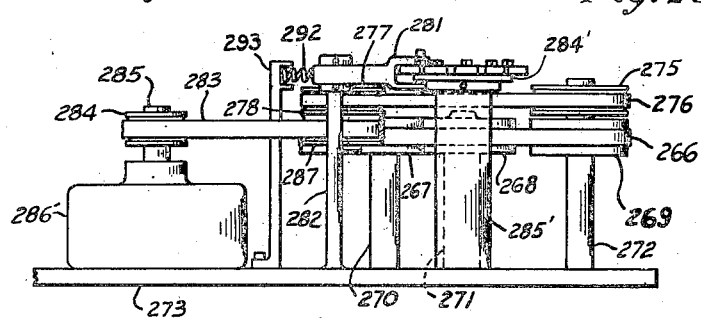

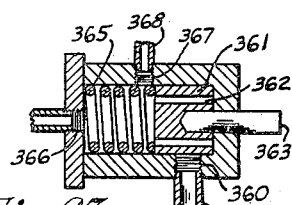
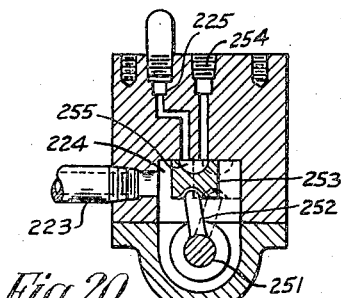
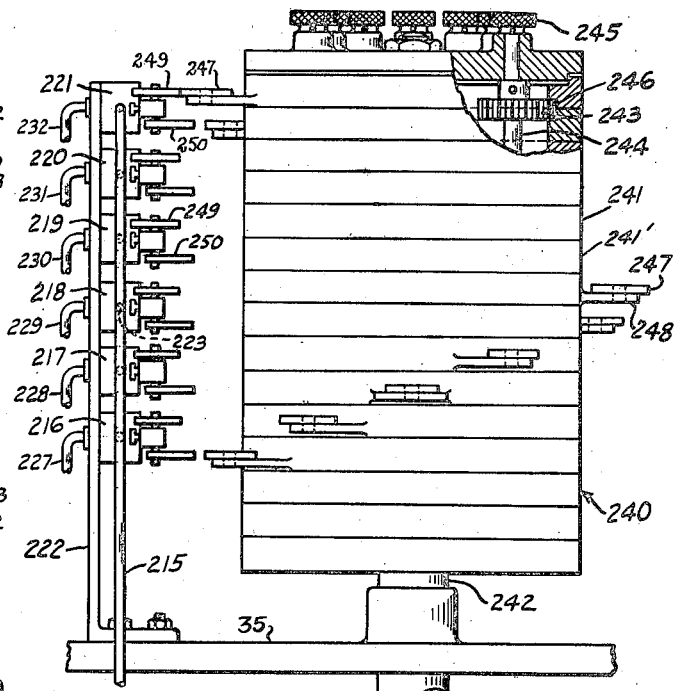
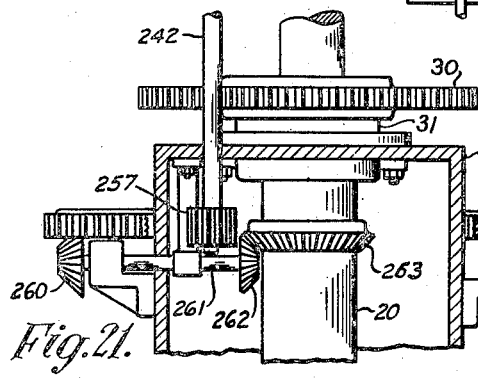
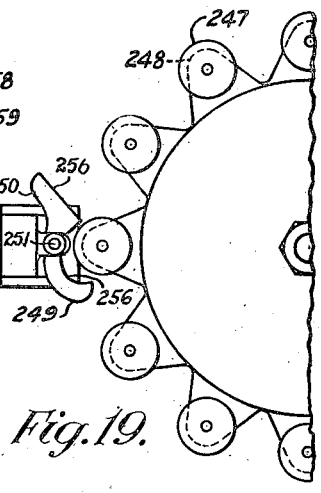
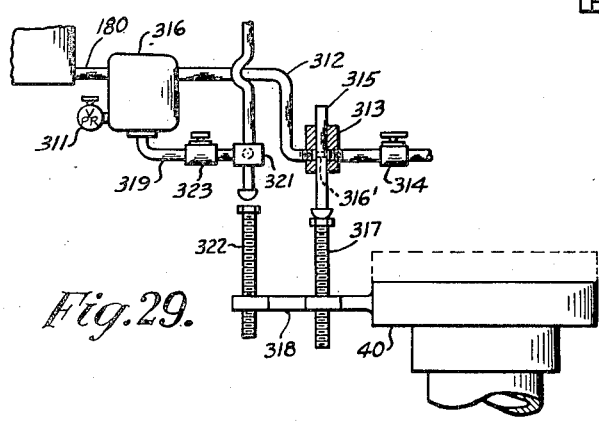

Patented May 22, 1945

2,376,800

UNITED STATES PATENT OFFICE 2,376,800

APPARATUS FOR MANUFACTURING POTTERY WARE

William J. Miller, Swissvale, Pa., assignor to Miller Pottery Engineering Company, Swissvale, Pa., a corporation of Pennsylvania Application January 13, 1944, Serial No. 518,079

36 Claims. (Cl. 25—22)

This invention relates to apparatus for manufacturing pottery ware. It has to do with automatic machinery for feeding, pressing and jiggering clay on plaster molds in making dinnerware articles and the like and relates particularly to apparatus for diversifying the production of these articles when being made automatically.

In certain types of automatic dinnerware forming machinery having an intermittently rotating mold table, for instance that disclosed in the patent to W. H. Emerson, 2,321,471, the molds are carried in the mold forks thereof in single file to the feeding station, where disc-like blanks of clay are cut off from a column of clay and fed thereto and then to a pressing and a jiggering station where the blanks are spread over the ware forming surface and profiled respectively. Only articles having the same form are made in succession in the single line of production which may contain several thousand molds, because there is only one die and one profile, serving the line.

To change the production to some other form of ware requires exchanging the die, profile tool and all of the molds besides making certain adjustments to feeding, preforming, jiggering apparatus as well as other operating parts of the machinery. Where the amount and kind of ware to be made on the machinery during the days operation is even moderately diversified, the production time lost making changeovers may result in serious depreciation in the savings in the cost of manufacture of the ware. In the majority of commercial potteries there is considerable variation daily, in the amount and kind of ware made because of differences in the consist of an ordinary dinnerware set and differences in the form of the consist as between dinnerware sets it being characteristic of the industry to provide a large variety of shapes from which to select.

It is among the objects of this invention to provide for making diverse ware shapes during sustained operation of automatic ware forming machinery of the class described to thereby eliminate the need for frequent stops to change from one shape to another and save the production time ordinarily lost when making such changeovers as well as the labor cost incurred in making changes.

Another object is to provide for high and low form diversity in ware making machinery of this description so that identical or diverse ware may be mass produced as desired, without increase in the cost of manufacture. Another object is to provide automatic ware forming machinery adaptable for large mass production potteries turning out large quantities of standardized shapes as well as smaller potteries having a more diversified production and smaller quantities of each shape to produce.

Other more specific objects are:

To make a diversified production with the same speed and efficiency as an identical production;

To reduce initial mold equipment costs and storage requirements and the cost of exchanging molds.

To periodically cut off and feed to diverse molds therebelow disc-like blanks or charges of clay from intermittently advanced columns of clay of the same or different composition, the diameter and thickness of the charges to be selectively predetermined and varied automatically in accordance with the requirements for the diverse molds and for the products being made;

To feed clay from one or the other of a pair of tubes through a single outlet common to both instead of individual outlets, to a continuously operated cut off means above the mold indexing table, and to automatically switch from one tube to the other when one becomes empty to thereby maintain a substantially constant flow of clay to the outlet and eliminate the need for phase changing mechanism customarily employed to maintain the cut off means properly synchronized with the indexing of the mold table, where the feed is switched from one outlet to another;

To form, by pressing and profiling, diverse ware shapes in succession, the spread and thickness of each bat to be selectively predetermined for each shape and the speed of rotation of the jigger tools and the amount of jiggering lubricant supplied for jiggering the bats to be varied automatically according to the requirements of the diverse production;

To simplify and reduce equipment by using the condensate from the steam dies to lubricate the ware during jiggering thereby eliminating considerable equipment heretofore employed and to more efficiently and thoroughly discharge excess clay from the jigger chamber by employing the rotating profile to eject the clay thereby eliminating the customary power-driven scraper and operating mechanism therefor.

Ware making machinery constructed in accordance with this invention comprises, broadly, a rotatable support having revolvable mold carriers thereon which are revolved on their respective axes as the table rotates to index the carriers and molds thereon from station to station. At one or more stations are clay feeders operating in synchronized fashion with the movement of the rotatable support and carriers to discharge, cut off and deposit the proper amount of clay required by each mold thereon. At other of the stations, which are individual to and movable with each carrier, are ware fabricating means including preforming dies and profiling mechanism automatically operable to perform their respective operations when the mold, or the associated carrier, is in register therewith. At other stations are means for depositing empty molds on the mold carriers and lifting and carrying away filled molds therefrom in the form of an endless chain conveyor being formed to co-operate with the carriers in this manner and synchronized with the movement of the rotatable support and carriers.

Since the preforming and profiling means are individual to each revolvable mold carrier and the machinery includes a plurality of these carriers, the carriers may be formed to receive different sizes and shapes of molds and the preforming and profiling means may be formed to fabricate different forms of ware and are individually adjustable to provide for optimum fabrication technique. Thus insofar as production diversification is concerned, it may be varied in direct proportion to the number of revolvable mold carriers employed.

Other objects and advantageous features will be noted in the following detailed description and drawings, wherein:

Figure 4 is a horizontal plan view looking down in the direction of arrows 4—4 of Figure 1, showing the twin machines and drive therebetween some of the parts being broken away.

Figure 5 is a horizontal plan view taken in the direction of arrows 5—5 of Figure 1.

Figure 7 is a sectional elevation of one of the hydraulic mold lifters of the fabricating machine.

Figure 10 is a piping diagram of the hydraulic system associated with the clay feed tubes.

Figure 11 is a section view of a changeover valve incorporated in the hydraulic system of Figure 10 for switching the feed from one clay tube to another.

Figure 12 is a detail, partly in section of one of the plunger pumps incorporated in the hydraulic system of Figure 10.

Figure 13 is a section view of a pilot valve incorporated in the hydraulic system of Figure 10.

Figure 14 is a plan view of the twin feed tubes illustrating how clay may be supplied to each from plural magazines.

Figure 17 is an elevation partly in section of one of the jigger units.

Figure 17A is a vertical section of the jigger tool holder.

Figure 18 is an elevation partly broken away of the timer and valves for controlling compressed air supplied to the spray guns of the jigger units one of which is illustrated in Figure 17.

Figure 19 is a top plan view of the left side of the timer of Figure 18.

Figure 20 is a horizontal section through one of the control valves of Figure 18.

Figure 21 is a detail, partly in section of the timer drive.

Figure 22 is a detail in elevation, partly in section, of the fluid control valves and cams supplying fluid to the spray guns of the jigger units.

Figure 23 is a horizontal section through one of the valves of Figure 22.

Figure 24 is a side elevation of the jigger tool spindle drive.

Figure 25 is a front elevation on a reduced scale of the drive of Figure 24.

Figure 26 is a perspective view of the cam disc incorporated in the apparatus of Figure 24.

Figure 29 is a piping diagram illustrating how the discharge of condensate from the dies is regulated in supplying the jigger units.

The ware forming machines hereof are preferably connected together in pairs and are identical in construction and mode of operation except that the mold table of one rotates clockwise and the other counterclockwise. Only the left hand machine A has been fully illustrated but the location of the other machine B and the co-ordinating drive between the two are to be observed in Figures 2 and 4.

Figure 1:
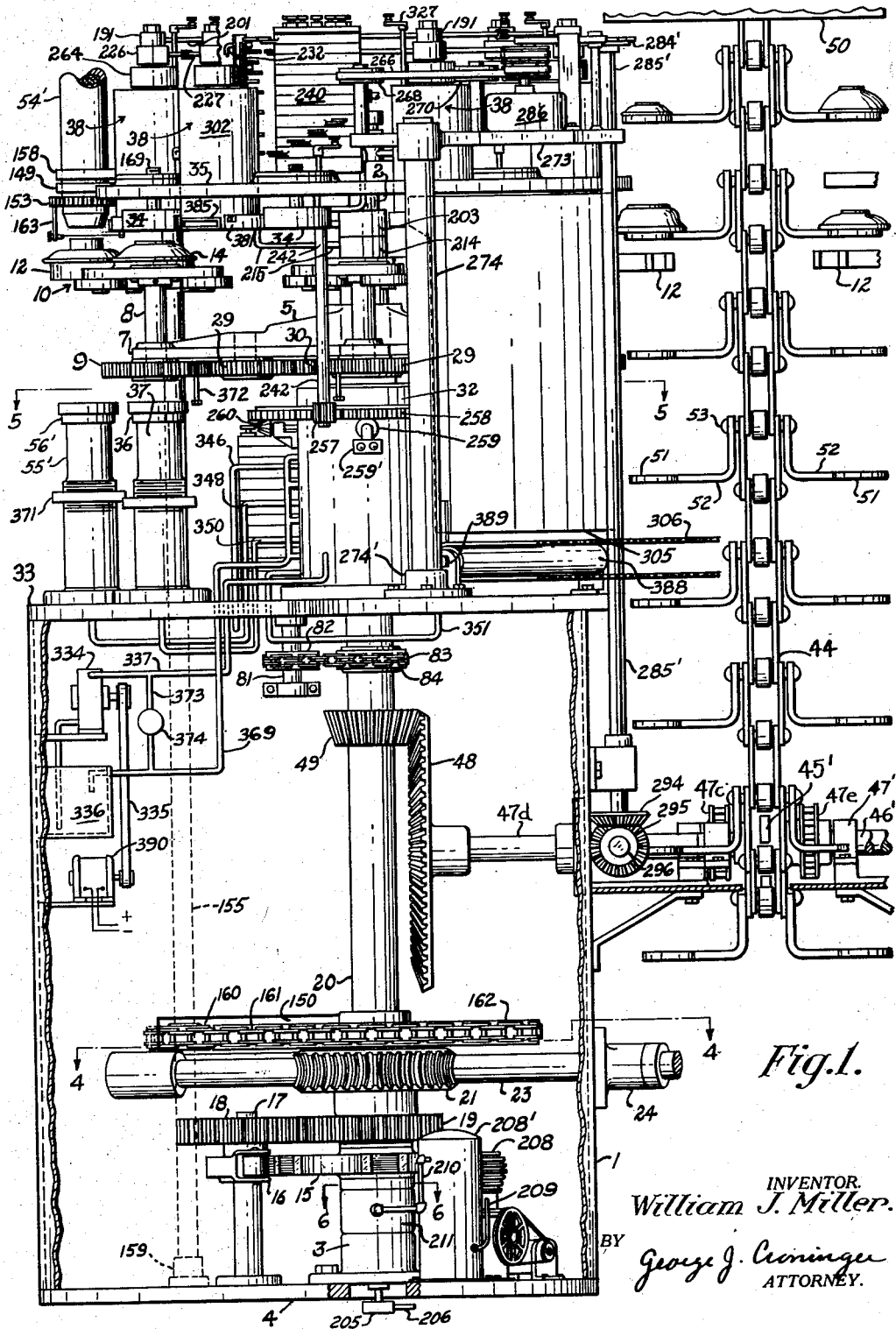
Figure 1 is an elevation of the preferred form of fabricating machine with certain of the parts broken away and in section.

Each machine has a cylindrical housing 1, Figure 1 said housings being located in spaced, parallel relation, and inside each is a vertical shaft 2 mounted in a bearing 3, Figure 1, secured to the machine base 4. Mounted on and rotatable with the upper end of shaft 2 is a spider 5 Figures 1 and 3 (sometimes called table), having a plurality of radial arms 6 each provided with a hollow boss 7, Figure 1, at the outer end to rotatably receive a stub shaft 8, Figure 3, on whose lower end is fixed a drive gear 9 and on whose upper end is fixed a mold carrier 10. The mold carrier 10 is formed with an exchangeable mold fork 12 having a semi-circular mold receiving recess of a size or diameter to receive the intermediate, annular, ledged portion of a pottery dinner ware mold 14. The size and shape of the several recesses 12' may vary over one another so as to accommodate molds of different size, shape and configuration used in making plates, cups and saucers and the like.

Figure 2:
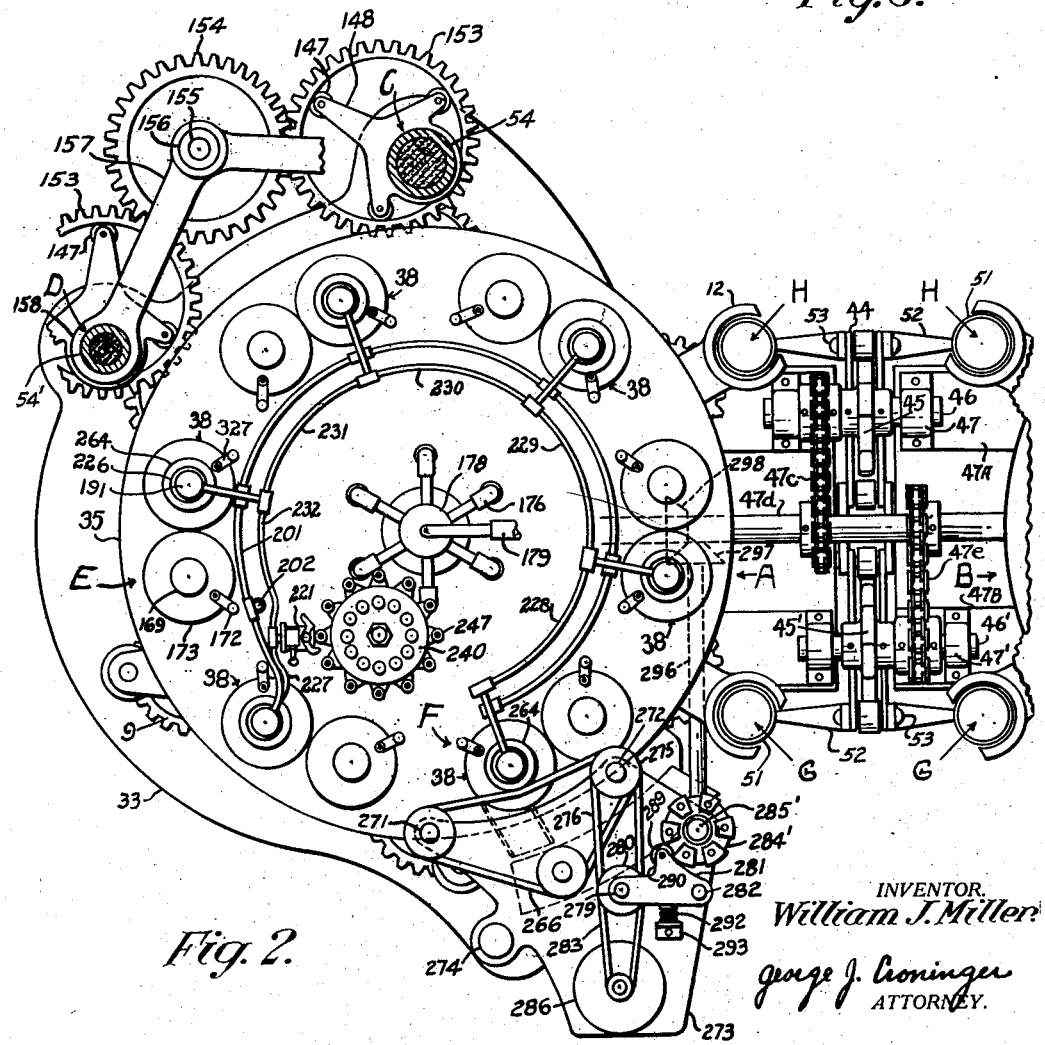
Figure 2 is a top plan view of the apparatus of Figure 1.

Shaft 2 is intermittently rotated by a Geneva mechanism including a gear 15, Figures 1 and 2, fixed on shaft 2. Gear 15 is rotated periodically by a driver 16, Figure 4, at one side of gear 15, fixed on shaft 17. Shaft 17 is rotated by gear 18 fixed thereon and gear 19 fixed on hollow shaft 20 sleeved on shaft 2. Shaft 20 is rotated by a worm gear 21 fixed thereon and a worm 22 on a horizontal drive shaft 23 common to both machines A and B.

Drive shaft 23 is journaled in bearings 24 mounted in housings 1 and one end of the drive shaft extends beyond the housing of machine A, Figure 2, and has a drive pulley 25 mounted thereon to be driven by a belt 26 and suitable prime mover (not shown). Shaft 23, worm 22 and worm gear 21 rotate continuously while shaft 2 and Geneva gear 15 rotate intermittently when driver 16 enters one of the slots 27 in gear 15.

Each of the mold carriers 10 is indexed to six circumferentially spaced locations or stations during one complete revolution of the table. These locations are: C and D, Figure 2, outside of the perimeter of the upper table 35 and stationary relative thereo where charges of clay are cut off and fed to molds carried by carriers 10; E inside the perimeter of upper table 35 where the preforming dies 34 carried thereby co-operate in successive order with previously charged molds to press the clay against the molding surface of the molds to spread out and affix the clay thereto; F, inside the perimeter of upper table 35 where the profiling units 38 co-operate in successive order with molds having preformed clay thereon to jigger the same and complete the plastic state formation thereof; G, outside the perimeter of the upper table 35 where filled molds are transferred to a dryer conveyor and H also outside the perimeter of table 35 where empty molds are received from the dryer conveyor.

Figure 3:
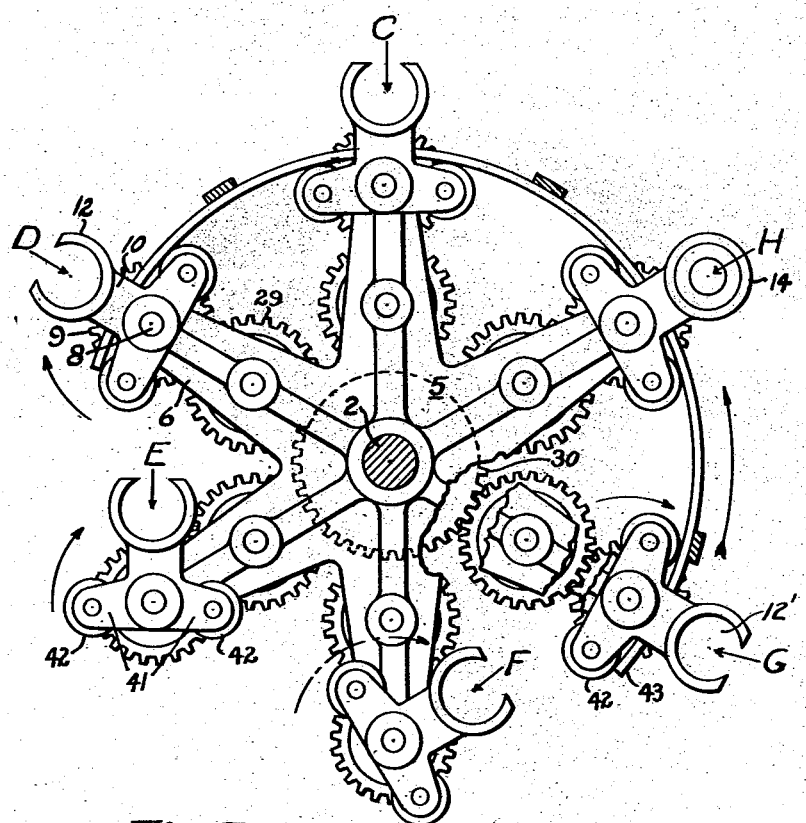
Figure 3 is a plan view of the rotatable mold support of the fabricating machine.

Each mold carrier 10, is caused to make one complete revolution about its axis between stations D and G by the engagement of the intermediate gear 29, Figure 3, rotatably mounted on each arm 6 with the toothed portion of stationary mutilated gear 30, Figures 1 and 3, fixed on a sleeve 31, Figure 21, bolted to stationary housing 32 secured to stationary table 33 Figure 2 forming the top of housing 1. Between stations D and E, the mold forks 12 are turned clockwise inwardly (see arrow) approximately 120° from their radial position at station D to transport the molds to a position below an overhead forming die 34 above each carrier 10 mounted on an intermittent, rotated, circular upper table 35, Figures 1 and 2, keyed to and rotating with shaft 2 to thereby carry the dies around the axis of shaft 2 and to and through station E with the mold carriers 10. At this position, the fork 12 of each carrier is vertically aligned with a mold chuck 36 (which defines the location of the station E therebelow, Figures 1 and 5, supported by a stationary hydraulic lift 37 mounted on plate 33 to be automatically actuated to raise the mold to the die as hereinafter described.

When the mold carriers are moved from station E to station F by the support the mold fork 12 thereof is caused to turn approximately 120° more on its axis to bring the mold and preformed charge of clay into vertical register with a jigger unit 38 above each carrier 10 and also mounted on overhead support 35 and rotatable on the axis of shaft 2 with the carrier 10 and a stationary hydraulic lift 39 defining the location of station F Figures 1 and 5 mounted on table 33 below and in register with the jigger and having a mold chuck 40 for receiving the molds carried by carriers 10 and elevating them to the jigger.

When the mold carrier 10 is moved from station F to station G it is caused to turn so that the mold fork assumes a radial and outwardly projecting position with respect to the arm 6, Figure 1, on which it is mounted and, to prevent the carrier from idly rotating from this position between stations G and D in the interrupted portion of gear 30, the carrier is formed with lateral extensions 41, Figure 3, mounting rollers 42 therebelow spaced on opposite sides of shaft 8 to engage a stationary, semi-circular roller guide 43, Figure 3, extending circumferentially around the machine between the stations specified. Thus, it will be noted that each mold carrier 10 has a traveling, preforming or pressing die and a jigger unit associated therewith and that the mold lifters at positions E and F are common to all of the mold carriers and stationary insofar as being rotatable about the axis of shaft 2 is concerned.

At stations G, where filled molds are removed from carriers 10 and at station H where empty molds are placed on said carriers, and endless chain 44, Figures 1 and 2 extends around and upwardly in parallel vertical strands from spaced, parallel sprockets 45 and 45' fixed on shafts 46 and 46' journaled in bearings 47 and 47' on supports 47A and 47B mounted on the housings 1 of machine A and B respectively. Sprocket 45 is rotated by chain drive 47C from shaft 47D which has a gear 48 fixed on one end thereof driven by a gear 49 fixed on continuously rotating hollow shaft 20. Sprocket 45' is rotated by chain drive 47E. Shaft 47D drives apparatus of machine B corresponding to that of machine A. Chain 44 is adapted to transport the ware forming molds through an overhead dryer 50, Figure 1, in which the air is properly conditioned and circulated to insure drying of the ware within the time interval the ware remains inside the dryer while traversing the circuit. After the ware dries and releases from the molds it may be removed from the conveyor by hand or automatically at a convenient location (not shown), the molds being then returned to the forming machines in their respective lines and cleaned of chips or scrap clay and conditioned for refilling en route.

The molds are carried in the conveyor in pairs of horizontally disposed ring seats 51 formed with hanger arms 52 pivotally connected to and on the opposite ends of every other chain pin 53. These seats form in the direction of the length of the conveyor, parallel lines of production in which as many different shapes and sizes of product may be made as there are mold carriers 10 on the two machines A and B and in the illustrated example the maximum diversification for the combined machines would amount to twelve or half that amount for each line of production. The ring seats 51 and the molds would therefore be arranged in successive series of six (maximum for the illustrated structure) in each production line or series of lesser number if desired. Corresponding rings and molds would in any event occupy the same relative position in each set in a given line and would co-operate with a corresponding mold carrier 10, die 34 and jigger 38 on the machine serving the line in question.

The downwardly moving strand of chain carries the rings 51 through the recesses 12' of the mold forks 12, successively presented at station H, Figure 3, the rings being of smaller diameter than the opening in the mold forks so as to pass therethrough. The molds are seated on the underside of their brims (which is larger in diameter than the rings or mold forks) in the rings 51, and are deposited on the forks 12 at station H, by the downwardly moving strand of chain, the empty rings being carried around sprockets 45 and 45' and then upwardly through successively presented forks 12, at station G to lift filled molds and carry them away, the same ring 51 that deposits a given mold on the forks of a machine, preferably picking up the same mold after it has been filled.

Empty molds transferred to carriers 10 at station H are transported to station C in register with the stationary outlet end of an overhead feed tube 54 Figure 2 and a mold lifter 55 Figure 5 and chuck 56 in which the mold is received, the mold lifter being like that shown in Figure 7. Due to the production diversification possible and the fact that some molds may require charges of clay of larger diameter or composition than others, I provide another feeding station D where charges may also be fed to the molds. Since both feeding mechanisms are structurally the same only one will be described in detail with the exception of the co-ordinating mechanism that enables automatic alternation of the feeding of charges between the stations specified. This station also has an overhead feed tube 54' and a chuck 56' and mold lifter 55', Figures 1, 2 and 5.

Figure 8:
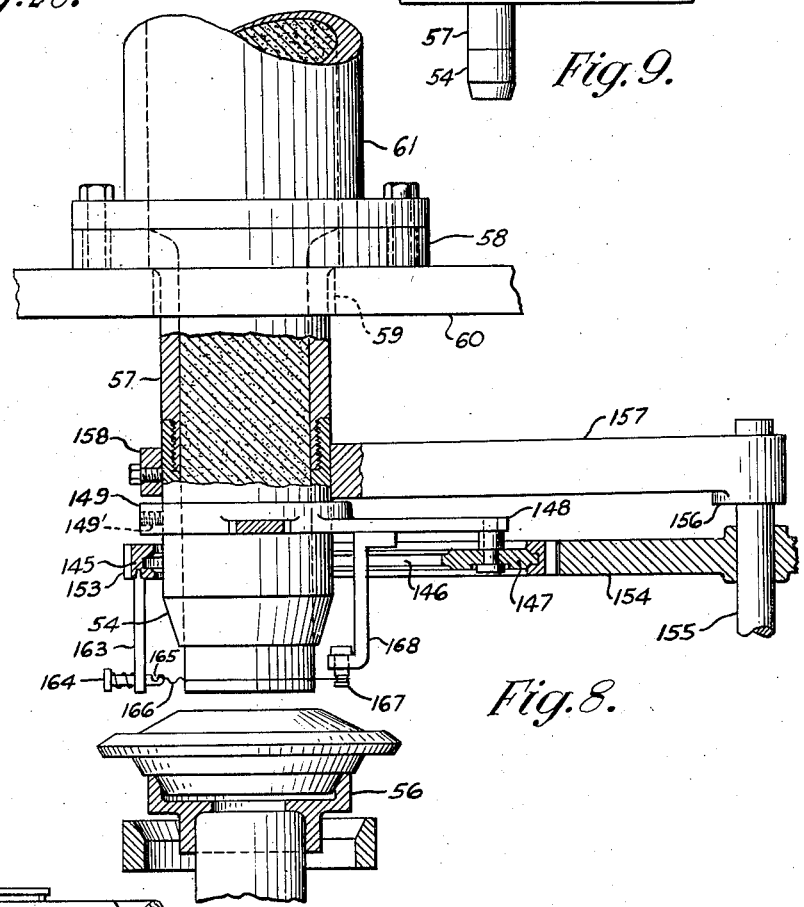
Figure 8 is a detail in elevation, partly in section of the discharge end of one of the twin feed tubes showing the charge cutting-off means.
Figure 15:
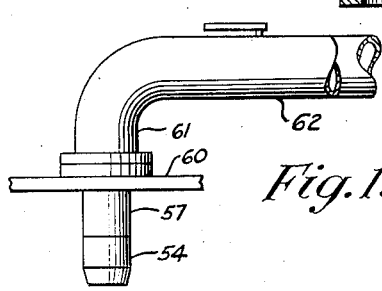
Figure 15 is a detail in side elevation of one of the feed tubes of Figure 14 showing the twin supply tubes.

With reference to Figure 8, which illustrates part of the feeder at station C, the feed tube 54 is detachably screwed into hollow conduit 57 in order that it may be adjusted vertically and/or replaced with tubes having different inside diameters to thereby vary the diameter of the circular charge to be produced. Conduit 57 is flanged at 58 and projects through an oversize hole 59 in support 60 thereby enabling axial adjustment relative to chuck, 56. Conduit 57 is axially aligned with and connected in leakproof sealed relation to the flanged outer end of the vertical section 61 of a hollow, elbow shaped Y tube 62, Figures 10 and 15. Each Y portion of the tube has connected thereto in leakproof sealed relation a replaceable magazine 63 of hollow cylindrical construction, flanged at both ends and supported, by cradles 64 and 65, fore and aft, the front cradles being in the form of a split collar pipe clamp with a lock 66 associated therewith for locking the magazine in feeding position. When a magazine becomes empty, the feed is automatically shifted to the other magazine so that a supply of clay will always be available at the outlet end of tube 54 while the empty magazine is being refilled and replaced. Where it is desired to change the feed from one color or composition of clay to another, the other magazine of a pair may contain another kind of clay answering such specifications and the molds so arranged on the machine as to affect the changeover by the time the other clay reaches the outlet of tube 54.

Each clay feeding station C and D is provided with hydraulically actuated apparatus, including twin rams 68 and 68' for forcing clay from the refill magazines through the feed tube 54 at each station to the cutting wire therebelow. In the actuation and control of the hydraulic system of each station I propose to employ either a single timer 77', Figure 10A, common to both stations C and D or independent timers 77 of the type illustrated in Figure 10 individual to each system. Since the systems are identical and operate alike only one of them has been fully illustrated and described, this being shown in Figure 10 equipped with an individual timer 77 it being understood that in actual practice, the twin rams 68 and 68' of station C, Figure 14, and the twin rams 68 and 68' of station D, would each be provided with the hydraulic system of Figure 10 and operated either with a single timer, Figures 5 and 10A, or independent timers, Figure 10. In either event the timer drive is co-ordinated with the rotation of the mold support in order to deliver clay to the cut-off wire at stations C and D in timed relation with the presentation of molds at either one or both of said stations.

With relation to Figure 10, the hydraulic system of station C or D comprises a vertical series of six pumps, 71, 72, 73, 74, 75 and 76, Figure 10, to be actuated by a timer 77 having cam rollers 78 mounted on the periphery of cam rings 79 that are angularly adjustable while in operation by means of control knobs 80 as is customary in timers of this type. These pumps control the amount of clay extruded through the feed tubes and regulate the volume of clay contained in individual charges. The rings 79 are rotated together and continuously by means of shaft 81, sprocket 82, Figures 1 and 10, and chain 83, connected to a sprocket 84, fixed on continuously rotating hollow shaft 20. The pumps are vertically positioned one over the other although they may, if desired, be spaced circumferentially of the timer.

The timer makes one complete revolution in the same interval of time required for the intermittently rotating spider 5 to make one complete revolution.

Each pump comprises a piston chamber 85, Figure 12, having a piston 86 therein and return spring 87. The piston rod 88 is hollow and threaded to receive a screw 89 which may be screwed outwardly until the head 89' is engaged by one of the cam rollers 78 and then adjusted to regulate the stroke or screwed entirely in to render the pump inoperative. The inlets of all pumps in a set are connected by branch lines 90, each having a check valve 91 therein, to a main header 92 leading to a tank 93 containing hydraulic fluid. The outlets of all pumps in a set are connected by branch lines 94, each having a check valve 95 therein, to a main header 96 leading to port 97 of a valve 98, Figures 10 and 11, operable to automatically discontinue the clay pumping action of one ram, for instance 68' Figure 14, when the magazine with which it is associated is emptied of clay and start the other ram 68. This is accomplished in the following manner.

The pressure fluid pumped into header 96, Figure 10, by each individual pump forces fluid in the line through port 97 of valve 98 and thence through open port 99 between movable discs 108 and 109 into pipe 100 leading to the piston cylinder of ram 69. As piston 11 advances in cylinder 68, fluid is forced out of said chamber through line 101 and open port 110' into the valve chamber between movable disc 128 and the stationary central dividing wall 138 of valve 98, and then into passage 126' and out through port 126 into a return line 127 leading to tank 118. When the ram head 69 reaches its forward limit of travel in magazine 63, line 101 is closed by piston 11 and the increase in fluid pressure in line 100 thereupon acts to increase the fluid pressure in line 102 leading to adjustable pilot valve 103, Figure 13, and opens valve 103 by depressing piston 104 against adjustable spring tension thereby opening outlet line 105 leading to piston chamber 106, Figure 11, in the left end of the housing of valve 98. Fluid in the lower part of valve 103 that is displaced by piston 104, enters line 104' leading to tank 93 Figure 10. Pressure fluid entering chamber 106, Figure 11, shifts piston rod 107 to the right thereby causing disc 108 fixed thereon to move to the right of port 99 and disc 109 to move to the right of port 110 thereby establishing communication between line 113 leading to the piston cylinder of ram 68' and port 97 connected to pump line 96.

As piston 11' advances in cylinder 70, fluid is forced out of the chamber through line 122 and port 121 into the chamber between disc 125 and the end wall 125' of valve 98 and then into passage 126' and port 126 into return line 127. When piston 11' reaches its limit of forward movement the increased pressure in line 113 opens pilot valve 114 (having the same construction as pilot valve 103, Figure 13) permitting fluid under pressure in line 115 to flow into piston chamber 116, Figure 11, and shift piston rod 107 to the left to again connect line 100 to pressure pumps 71—76 and start ram 68.

To retract ram head 69' from its magazine 63 when the feed is switched to ram 68 a motor driven pump 117, Figure 10, forces fluid from tank 118 into line 119 leading to port 120 in valve 98 and thence through port 121 into line 122 leading to cylinder 681. This forces piston 11' to the opposite end of cylinder 70, the fluid on the opposite side thereof being forced through line 113 and port 110 into valve 98 and then through passage 123' and port 123 into line 124 which discharges into tank 93. When the feed is changed from ram 68 to ram 681 the movement of piston rod 107 to the right, Figure 11, shifts disc 109 to the right of port 99 permitting back flow of fluid through line 100, port 99, passage 123', port 123 and return line 124 to tank 93. When piston 11' or 11, either one, reaches the limit of its rearward stroke the increase in pressure in the line 119 opens relief valve 130 and by-passes fluid from the pump into tank 118 through line 131.

It is desired to close off the idle branch of the Y 62 to preclude back extrusion of material therethrough when clay is flowing through the other branch and for this purpose, a pivoted gate 132 is located interiorly of the conduit at the junction of the branches of the Y and is automatically operated from the exterior in the following manner. An arm 133, Figure 14, is attached to the pivot shaft of gate 132 and is pivotally connected to the piston rod 132 of pivotally mounted air cylinder 135. Flexible fluid lines 136 and 137 leading from opposite ends of the cylinder are connected to a valve 136' which is identical with valve 98 except that it has a single chamber as would be represented by the structure on the right side of the dividing partition 138 Figure 11. Thus when changing from ram 68 to ram 70, the increase in pressure in line 105 also increases the pressure in line 139, see Figures 10 and 14, to thereby move piston rod 107 from right to left thereby permitting air under pressure to flow from tank 140 through line 141, valve 136', and the line 136 into cylinder 135 to move the piston toward the opposite end of the cylinder and swing gate 132 to the position shown in dotted lines closing off the right branch of the Y. Line 137 is vented to atmosphere through port 137' in said valve 136'. When changing from ram 68' to ram 68, the increase in pressure in line 112 is effective through line 142 to reverse valve 136' and connect line 137 to tank 140 pressure thereby reversing the movement of the piston in cylinder 135 and swinging gate 132 into position to close off the left branch of the Y and open the right branch.

Figures 10A, 32:
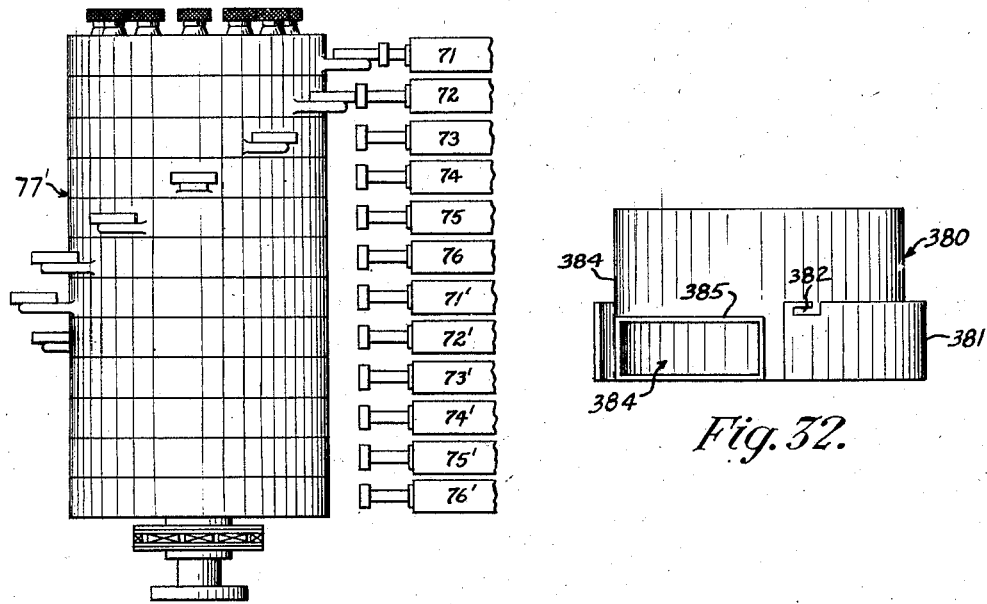
Figure 10A is a diagrammatic illustration of a twelve ring timer and valves for system of Figure 10.
Figure 32 is an elevation of the ejector structure of Figure 30, removed from the lower end of the jigger housing.

Each pump may be individually regulated and set while the machine is at rest or in operation to deliver a predetermined amount of incompressible fluid proportionally equal to the amount of incompressible clay to be extruded past the cutting off point. For instance, pump 71 may be set to deliver an 8 oz. charge through the outlet while pump 72 may be set to deliver a 12 oz. charge and so on or all may be set to deliver charges of equal weight depending on the production.

Where it is desired to employ only one timer to control the feed at stations C and D, a timer 77', Figure 10A, having twelve rings but otherwise identical with the timer 77, may be employed. In this event the pumps 71 to 76 inclusive of the hydraulic system associated with station C would be located above and in vertical alignment with a lower set of pumps 71' to 76' inclusive associated with the hydraulic system for the rams of station D which, as explained before, is identical with that shown in Figure 10.

Thus with either a dual or single timer arrangement many variations in the feeding of charges of clay to molds at either one or both stations is possible. For instance, all the charges to be fed a given group of molds may be applied at either station C or station D if it is desired to feed through one tube only. This might occur where all of the charges have the same diameter and vary only in thickness. If two timers are being employed, the timer not in use may be disconnected from the main drive or if a single 12 ring timer is being employed, six of the cam rollers may simply be removed from their pins to render six pumps inoperative.

In making laminated ware, that is to say ware having two thicknesses of material of different color, composition or coefficient of expansion, one charge may be fed at station C and another charge deposited on top thereof at station D. The thickness and diameter of either charge may be the same or different depending on the requirements and these specifications of charges to be applied to successive molds of a group could be varied.

Inlaid ware can be produced by utilizing the feeder at station C to apply the desired design to the molding surface first and the feeder at station D to apply the body of the ware over the design which may be of clay having a contrasting color. The feeder at C can easily be converted to produce individual decorative designs of clay by screwing an adapter into the end of the nozzle which has properly formed extrusion holes therethrough to give the extrusion the proper cross sectional shape.

Successive molds in a group may also be fed single charges in succession. This would be accomplished by adjusting the timer to impart two feeding impulses simultaneously, one at each station, and then be idle for the next two movements of the mold support in order to remove the filled molds from the feeding portions and move two empty molds into position for receiving charges of clay. Thus the charges fed to successive molds may vary in diameter, thickness, weight, volume, color and composition.

Figure 9:
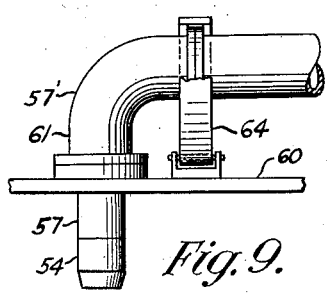
Figure 9 is a detail illustrating how the clay magazines are attached to the feed tubes.

If desired, the Y 62 may be replaced at both stations C and D by an elbow 57', Figure 9. In this event one of the magazines 63, Figure 10, would be installed at station C and the other at station D. Thus the hydraulic system of Figure 10 would operate to control the feed between two feeding stations rather than between two rams serving a single station. With this arrangement, molds are fed with clay at station C until the magazine 63 thereat is emptied of clay, and then the clay feed is automatically switched to station D.

The clay issuing from tubes 54 at stations C and D is cut off and deposited on the molds by the following apparatus: surrounding each nozzle 54 is a ring gear 145, Figure 8, whose axis is eccentric to that of the nozzle. The inside periphery of each ring 145 has a groove 146 in which three angularly spaced rollers 147, Figure 2, are received. These rollers are carried by a spider 148 having a hub 149 sleeved on the tube and secured thereto by set screw 149' to thereby support the ring 145 for rotation about an axis that is eccentric to the vertical axis of the tube 57 at station C or D.

To rotate rings 145, each is provided with an externally toothed surface 153 which meshes with a gear 154 between the two fixed on a vertical drive shaft 155, Figures 1, 2 and 8, journaled at the upper end in a bearing 156 in a supporting frame 157, Figure 8, having attaching collars 158 at the extremities to be sleeved on the feed tubes 57 at C and D. The lower end of shaft 155, Figures 1 and 2, is journaled in a bearing 159 outside the main housing 1 and is provided with a sprocket 160 driven by chain 161 which enters the housing through aperture 150 and is connected to sprocket 162 fixed on hollow shaft 20 which continuously rotates and thereby continuously rotates ring gears 145.

Screwed into the underside of each ring gear 145 is a post 163, Figure 8, which projects downwardly and carries a horizontal wire tensioning screw 164 with a notch 165 at the end to receive one end of a cutting wire 166. The other end of the wire is attached to a vertical pin 167 freely rotatable in a bracket 168 attached to and depending from one of the spider arms of each spider in such position that pins 167 are located on the axis of rotation of each gear 145. Thus, as each ring is rotated, each cutting wire is caused to pass below the nozzle 54 with which it is associated once for every complete revolution of the ring gear to which it is attached to thereby sever a charge of clay from the extrusion and deposit said charge on a mold therebelow.

The cutting wires operate continuously regardless of whether the tube is idle or not and they are synchronized with the indexing of molds at the feeding positions and are geared so as to make six complete revolutions to one complete revolution of the upper table 35 and to start the cutting operation incident to the movement of a mold into register with the nozzle 54 at the feeding position or positions.

Figure 16:
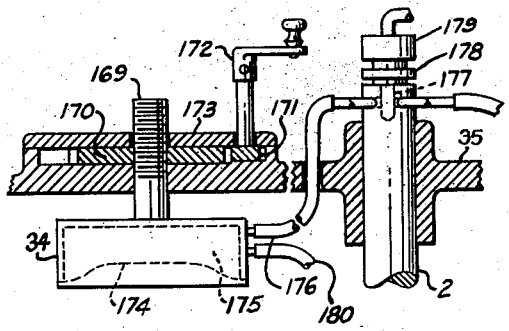
Figure 16 is a detail, partly in section of one of the preforming dies and steam connections for heating the same.

To spread the clay over the molding surface of the molds, and adhesively bond the same thereto, the machine is provided with six angularly spaced dies 34, Figures 1, 2 and 16 that are attached to and carried by upper table 35, one associated with and located above each mold carrier 10. Each die is suspended below table 35 by a mounting stud 169, Figure 16 journaled in a hole in table 35 and screw threaded into a gear 170 meshing with a gear 171 above the table to be turned by a hand crank 172 for vertically adjusting the die by hand. The gears are mounted in a covered housing 173 on top of table 35. Each die 34 is detachably mounted on the stud, the connection preferably enabling quick separation in order that replacement dies may be quickly substituted.

To render the ware engaging surfaces 174 of the dies non-adhesive to clay, each is formed with a chamber 175, Figure 16 to be heated by steam conducted thereto by flexible conduits 176 radiating from a central passage 177 in rotatable shaft 2. Line 177 may be connected by a leakproof gland 178 Figures 2 and 16, to a stationary header 179 from the boiler (not shown). Conduit 180 connected to the outlet of each die chamber is arranged to conduct the condensate to a point of discharge or to the jigger with which the die is associated to lubricate the ware during profiling as will be hereinafter explained.

The radial position of the dies 34 relative to the vertical axis of shaft 2 coincides with that of the mold lifter and chuck at station E in order that the dies shall register therewith in succession incident to intermittent rotation of table 35.

After the clay has been spread over the molding surface of a given mold and the mold returned to the fork 12 by mold lifter 37, the table automatically revolves one sixth of a turn whilst the carrier 10 supporting the mold in its fork 12 is revolved to a position where the mold fork 12 and mold are in vertical registration with a jiggering apparatus thereabove and a mold lifter 36 therebelow at location F.

The jiggering apparatus may include a single profile 181, Figures 17 and 17A detachably bolted to a holder 182 formed with a sleeve 183 screwed on a hollow, rotatable spindle 184 or may have diametrically opposed, balanced blades if desired. On opposite sides of sleeve 183 are spray guns 185 and 185' adjustably received in holders 186 that are bolted to radial projections 187 of sleeve 183 and are angularly adjustable.

The entire structure which revolves including the spindle, spray guns, profiles, profile holders, drive pulley etc. is dynamically and statically balanced so as to dampen torsional vibration and insure true running of the tools. Said tools 181 may have different jiggering characteristics, for instance one blade may be for rough cutting and the other for finishing or polishing or both may have the same jiggering characteristics.

Water for lubricating the ware during jiggering is continuously supplied to the spray guns which are of conventional design having an automatic valve in the water line to be opened when compressed air is turned on to atomize the water. Water enters the hollow spindle 184 at the top through stationary pipe 190 and leakproof gland 191, Figure 17, and flows through radial passages 192 in the spindle into the hollow center 193 thereof and then into vertical pipe 194 and downwardly to the lower end into passage 195 leading to both guns having pipe connections 196 screwed in the open ends and flexible hoses 197 attached thereto and to the inlet of the spray guns.

Figure 6:
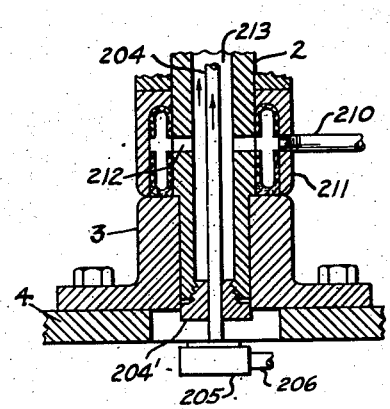
Figure 6 is a vertical section on line 6—6 of Figure 1 showing the glands and fluid connections at the base of the vertical drive shaft of the fabricating machine.

The water supply pipes 198 of each jigger unit are all connected to a common header 201 on top of upper table 35, Figure 2. The header is supplied with water by pipe 202 which extends downwardly through a hole in the upper table and is connected to a gland 203, Figure 1, surrounding and rotatable relative to rotatable shaft 2, said shaft having a hollow center in which is located a water pipe 204, Figure 6, communicating with the gland and projecting through a pipe plug 204' in the lower end of the shaft where it is connected to a gland 205, Figures 1 and 6, whose inlet is connected to a water main 206.

To supply air under pressure to the several jigger units, a motor driven compressor 208, mounted on the base of the machine is provided. The discharge pipe 209 is connected to a pressure equalizing tank 208'; and the tank outlet is connected to a gland 211 on shaft 2, by a pipe 210, Figures 1, 4 and 6 said shaft having radial holes 212 to admit air to the hollow interior 213 thereof.

Below gland 203, Figure 1, is mounted another gland 214 through which air from the hollow interior of shaft 2 is admitted to pipe 215 and conducted upwardly thereby to a bank of vertically disposed air control valves 216 to 221 inclusive, Figures 1, 2 and 18, one for each jigger unit mounted on a standard 222 secured to and rotatable with upper table 35, there being branch pipes 223 Figures 18 and 20 from line 215 to the inlet port 224, Figure 20, of each valve. The outlet port 225 of each of the valves 216 to 221 inclusive is connected to a gland 226, Figure 17 on the hollow jigger spindles 184 by pipes 227, 228, 229, 230, 231 and 232 respectively, Figures 2 and 18.

Radial passages 233, Figure 17, admit air to the hollow interior of jigger spindles 184 which flows through a radial passage 234 Figure 17A near the lower end of the spindle into a vertical passage 235 in sleeve 183 and into duct 236 common to both spray guns 185 and 185'. Flexible conduits 237, Figure 17, attached to pipe connections 238 screwed into the ends of duct 236 connect the duct with the air inlet of the spray guns. The profusion of the spray is controlled by a needle valve which is manually regulated by control 239.

Valves 216 to 221 are operated by a rotatable timer 240, Figures 1, 2 and 18, mounted on and rotatable with upper table 35. The timer is conventional in design and has a vertically disposed series of nested, concentric cam rings 241, rotatable in unison by shaft 242 but individually angularly adjustable relative to one another by gears 243 on shafts 244 which are turned manually by knobs 245 to effect the adjustment. These gears engage the toothed inner periphery 246 of the rings and when turned, angularly position removable valve cam actuating rollers 247, Figures 18 and 19, mounted on projections 248 extending from the outer periphery of the rings whose setting determines the time during one complete revolution of the timer when the valves 216 to 221 inclusive will be turned on or off and consequently the time of initiation, duration and termination of the jigger spray.

Each valve 216 to 221 inclusive has two control cams 249 and 250, Figure 18, the upper cam for rotating shaft 251, Figure 20 in a clockwise direction to cause member 252 thereon to shift slide valve 253 to the right (see dotted lines) and thus establish communication between inlet port 224 and outlet port 225 and the lower cam 250 for rotating the shaft in a counter-clockwise direction to shift the slide valve 253 to the left and connect outlet port 225 and the vent 254 by way of passage 255 in the valve in order air pressure will be released instantly so that the water control valve (not shown) in the spray gun, which is air actuated will shut off promptly and thus prevent dribbling of water at the termination of the spraying operation onto the surface of the freshly formed ware.

Two adjacent cam rings 241 and 241' and their respective rollers 247 are required to open and close each valve and to open a valve, the roller of the upper ring of a pair (see top ring Figure 18) engages cam 249 whose roller engaging surface is arcuate in shape Figure 19, the tip end of which projects into the circumferential path of travel of the roller to be actuated thereby. The lower cam 250 of each valve has a roller engaging surface 256 disposed at such an angle that when moved into the path of travel of its operating roller on the next ring 241' and then engaged by the roller it will reverse the rotation of shaft 251 and consequently reverse the movement of slide 253 and close the valve.

The timer is rotated continuously by a vertical drive shaft 242, Figures 1 and 18 which extends downwardly through a bearing mounted on table 35 and has a gear 257, Figures 1 and 21, fixed on the lower end engaging a ring gear 258 mounted on rollers 259 journaled in brackets 259' attached to housing 32. Said ring gear is internally toothed as at 257' and is revolved by a gear 260 fixed on shaft 261 having a gear 262 on the other end meshing with gear 263 keyed on continuously rotating shaft 20. Thus as table 35 rotates, the timer revolves therewith around the axis of shaft 2 and is continuously rotated on the axis of shaft 242 so as to open and close the air control valves of each jiggering unit upon arrival thereof at the jiggering position F.

To rotate the jigger tool spindle 184 of each jigger, said jigger spindle has a pulley 264, Figure 17 secured thereto, to be engaged and revolved by a drive belt 266, Figures 2, 24, and 25 stretched between pulleys 267, 268 and 269 on vertical shafts 270, 271 and 272 respectively mounted on a platform 273 adjacent the periphery and above the level of upper table 35 opposite the jiggering location, supported by a column 274 socketed in a boss 274', Figure 1 on extension 274A of table 33, Figure 5. Shafts 270, 271 and 272 are triangularly spaced apart with shaft 270 being adjustable on the platform to take up tension in the belt. The run of the belt stretched beween pulleys 268 and 269 is substantially tangent to the circle of travel of the jigger spindle pulleys 264 about the axis of shaft 2 and said pulleys engage the belt as they approach the jiggering position F, Figure 2.

Fixed on shaft 272 above pulley 269 is a pulley 275 driven by a belt 276 received between the tapered belt receiving surfaces of an upper disc 277 and the floating center disc 278 of a variable speed pulley fixed on a shaft 279 journaled in an overhead bearing 280 Figure 2, at the outer end of an angularly movable support 281 Figures 2, 24 and 25 pivotally mounted on a shaft 282 secured to platform 273. A drive belt 283 connected to a pulley 284 on motor shaft 285, of electric motor 286' is received between the lower disc 287 and the central floating disc 278 of the variable speed pulley. By angularly moving support 281 the relative speed of travel of belt 276 may be automatically changed due to the change in radius of curvature of belts 276 and 283 around the variable pulley.

Since the speed of rotation of the jigger spindle 184 and hence the speed of rotation of the jigger tool, is not the same for all types, sizes and classes of ware and is subject to variation, I propose to automatically regulate the speed of rotation of each jigger spindle to that best suited to the work and in this connection, have provided a cam disc 284', Figures 24, 25, and 26 mounted on a shaft 285' with a plurality of radially disposed cams 286, one for each jigger unit, Figure 26 having cross slots 287 for radial and circumferential adjustment on attaching bolts 288. The radial position of the cams determines the amount of variation in speed of the jigger spindles and the circumferential setting the instant of initiation of the drive. The length of the cam surface determines the amount of variation in speed of the jigger spindles and the circumferential setting the instant of initiation of the drive. The length of the cam surface determines the direction of the drive at a given speed and these factors may vary as between individual jigger units.

As these cams rotate, they engage and depress roller 289 Figure 2 on a projection 290 of support 281 to angularly move said support against the tension of a spring 292 mounted in a holder 293 bolted to the platform 273. This causes the speed of travel of the jigger spindle drive belt 266 to change automatically as pulleys 264 approach the jiggering position and engage belt 266.

Cam disc 284' is rotated by shaft 285' which is driven continuously and caused to make one complete revolution in the time required for the upper table 35 to make one complete revolution by a gear 294 fixed thereon, Figure 1 driven by a gear 295 on shaft 296 which is driven by continuously rotating shaft 47D by gears 297 and 298, Figure 2.

Figure 27:
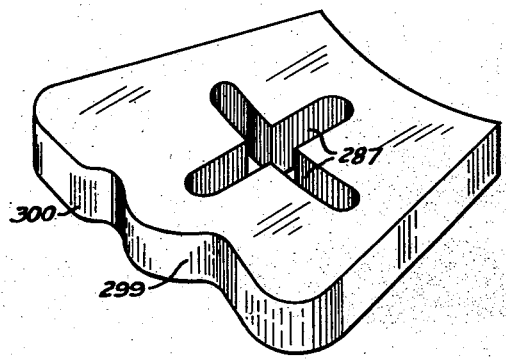
Figure 27 is a detail in perspective of a special purpose cam to be used with the cam disc of Figure 26.

If it is desired to vary the speed of rotation of any one of the jigger chuck spindles during the jiggering operation, the curvature of the cam surface may be developed to provide the desired change, for instance by one or more reverse curves 299, Figure 27, or the radius of curvature may be increased toward the trailing end of the surface as at 300 to provide for increasing the speed of rotation of the jigger tool beyond that necessary for jiggering just prior to completion of the jiggering operation and for a short period thereafter if desired, in order to throw off any stray bits of scrap clay which may cling to the tool.

Figures 30, 31:
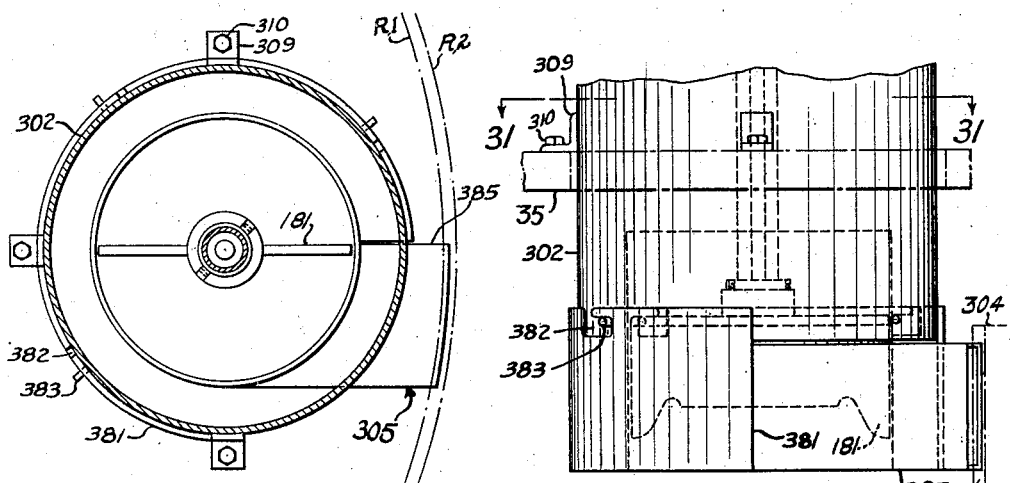
Figure 30 is an elevation showing the lower end of a jigger unit with a scrap clay ejector structure attached thereto.
Figure 31 is a horizontal section taken on line 31—31 of Figure 30.

The open bottom housing 302 which encloses the jigger unit, Figures 1, 29 and 30, projects through an oversize hole slightly in rear of the perimeter of table 35 and is supported thereon by brackets 309 with oversize holes therein for receiving bolts 310 screwed into the table. The jigger unit is capable of a limited amount of adjustment in centering the jigger tool on the vertical axis of the chuck therebelow.

Attached to the lower end of the housing is a replaceable casing 380 which co-operates with the jigger tool in directing the scrap clay produced during jiggering into a stationary chute 304. Said casing, Figure 17 comprises a sleeve portion 381 which fits over the outside of housing 302 and is attached thereto by several bayonet slot 382 and pin 383 connections. The slot is purposely made larger in order to allow the casing to be raised up by engagement of the perimeter of the mold therewith in that circular flange portion 150D of the bottom of the casing adjacent the circular sleeve 384 which projects upwardly inside housing 302 and surrounds tool 181, there being a minimum of clearance between the tool and the inside wall of sleeve 384. 385 is a side outlet nozzle from sleeve 384, Figure 32, which projects tangentially from the casing through the interrupted portion of sleeve 381 and an aperture 386 in the bottom housing 302 facing chute 304. The nozzle is preferably short and extends only a short distance beyond the perimeter of table 35. The radius of the nozzle tip co-incides with that of the perimeter of the table and the inlet 303 of the chute which is curved. While the major portion of the scrap clay is discharged at the jiggering position, the tool may rotate until pulley 264 disengages belt 266, see Figure 2, and thus the purpose of extending the chute beyond the point where the driving association is interrupted is to catch any stray bits of clay which may cling to the tool and not release until the tool starts to move away from the jiggering position. The speed of rotation of the tool may be increased near the end of the jiggering operation to make certain that all scrap clay clinging to the tool will be thrown off before it reaches the end of the chute. Otherwise the clay dries out on the tool and forms a scale which detrimentally affects the surface of the ware should it fall thereonto.

The floor of the nozzle 385 and the inlet 303 may slope, the angle of inclination co-inciding so as to readily gravitate scrap into the vertical portion of the chute which falls through the outlet 305, Figure 2, onto the surface of an endless offbearing belt 306 supported by roller 388 on a shaft journaled in bearings 389 below the outlet. The belt may discharge directly into a blunger (not shown) where the clay is mixed with water preparatory to reprocessing or it may discharge into a receptacle for conveying clay to the blunger or into the hopper of the pug mill for supplying the machine with clay. The chute is secured at the upper end to the underside of platform 273 and is supported on the extension 274A of table 33, Figure 5.

In the foregoing construction, the jigger tool 181 functions as the impeller of a centrifugal fan or pump to cause the discharge of scrap clay through the tangentially disposed nozzle. The mold substantially seals the bottom hole of sleeve 384 when it comes up against the housing and lifts it up off pins 383. This prevents scrap clay from falling down through the normally open end of the sleeve and due to the absence of any appreciable clearance between the inside wall of the sleeve and the tool, the scrap clay cannot accumulate on these surfaces and is compelled to leave the housing through the nozzle. This construction eliminates such appurtenances as spill pans, power driven scrapers, which operate in troughs surrounding the tool and push the clay over a hole in the floor of the trough, screw conveyors and other conventional equipment used to remove the scrap from the immediate vicinity of the tool.

When changing the jigger tool set up from larger to smaller diameter ware or vice versa, casing 380 may be removed and replaced by one having a sleeve 384 of proper diameter to operate as described with the replacement profile. The provision of a bayonet slot connection with the housing 302 facilitates replacement.

If desired, the condensate from the preforming steam die of each die and jigger unit may be piped to the jigger and used to lubricate the ware during jiggering. Pipe 180, Fig. 16 drains the condensate into a steam trap 316, Fig. 29, having a pressure relief valve 311. It is preferred to supply only a measured amount of fluid for the jiggering operation and therefore just prior to jiggering, any excess quantity accumulating in the trap between jiggering operations is discharged to atmosphere through drain line 312 by opening valve 313, the amount of liquid discharged being controlled by throttle valve 314. The plunger 315 of valve 313 is lifted to a position where the passage 316' therein registers with the inlet and outlet of the valve by an adjustable screw 317 in bracket 318 projecting from chuck 40. The screw is adjusted so as to open valve 313 as the jigger chuck approaches final elevation just before the jiggering operation commences.

Figure 28:
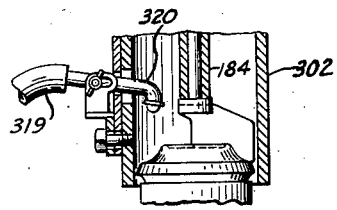
Figure 28 is a fragmentary elevation of a jigger unit employing a stationary nozzle for applying waste condensate from the steam die to lubricate the ware.

The measured quantity of condensate remaining in the steam trap is discharged through pipe 139 connected to an adjustable nozzle 320 mounted on and projecting through the side of jigger housing 302, Fig. 28, when valve 321, Fig. 29 is opened by adjustable screw 322 upon final elevation of the jigger chuck 40 which also causes valve 313 to close. The action of valve 321 is delayed until the excess condensate in the steam trap is discharged. 323 is a throttle valve in line 319 for control purposes.

In order to raise and lower the jigger tool 181 of the various jigger units, in making adjustments in the thickness of the ware, the hollow jigger spindle, Fig. 17, rotates in a sleeve 324 having a gear 325 screwed thereon disposed in a gear case 326 mounted on top of housing 302. Gear 325 is rotated to either raise or lower the profile tool by a hand crank 327 above the gear case which is fixed on shaft 328 having a gear 329 thereon meshing with gear 325.

The molds are raised and lowered at the feeding stations C and D, the preforming position E and jigger position F, from their respective carriers into operative adjacency to the feeder, die and jigger respectively by fluid actuated mold lifters that are identical in construction. Each comprises a hollow cylindrical housing 330, Fig. 7, closed at the upper end on which a chuck, for example the jigger chuck 40 is disposed. Said housing is sleeved over a shaft 331 having a vertical passage 331' through the center through which oil or other hydraulic fluid is conducted to the expansion chamber 332 from pipe 333 threaded into the bottom of the passage.

The hydraulic system for operating the four chucks comprises a pump 334, Figs. 1 and 4 driven by belt 335 and motor 390 to draw fluid from tank 336 and forces the same into pipe 337 which is connected by branch pipes Fig. 22 to each of valves 342, 343, 344 and 345, Fig. 22. Valve 342 is connected by pipe 346 to mold lifter 55, also see Fig. 5, mounted on an extension 366 of table 33 below feeding position C; valve 343 is connected by pipe 348 to mold lifter 55' mounted on an extension 367 of table 33 below the feeding position D; valve 344 is connected by pipe 350 to mold lifter 37 at preforming position E and valve 345 is connected by pipe 351 to mold lifter 39 at the jiggering position F. The valves are mounted on a vertical housing 32 bolted to stationary table 33. Each valve comprises a housing having an inlet port 360, Fig. 23, connected to the main fluid line 337. Inside the housing is a slide valve 361 with longitudinal passage 362 therein. When the slide valve is moved to the left by piston rod 363 and cam 364 on shaft 20, Fig. 22 against the tension of spring 365, Fig. 23, communication is established between inlet 360 and outlet 366 connected to a line, for instance pipe 346, Fig. 22 leading to mold lifter 55 to thereby raise said lifter, outlet port 367 which is connected to one of the branches 368 leading to a return line 369 discharging into tank 336, being temporarily closed by the slide valve. When the slide valve returns to the position shown in Fig. 23, communication is established between the port 366 and outlet port 367 and the weight of the piston chamber housing of the hydraulic lift, forces the fluid back into tank 336 permitting the chuck to lower by gravity and depositing the mold supported thereby in a transfer fork. A by pass 373 having a pressure release valve 374 therein is provided between the main fluid line 337 and return line 369, to relieve abnormal increases in pressure in the line.

Said mold lifters may raise and lower simultaneously or at different times depending on the development of the cam surface of cams 364. They are all raised and lowered however within the interval the upper table 35 is at rest.

To predetermine and adjust the altitude of reciprocation of said chucks, a ring 371, Figs. 1 and 7 is threaded on the outside of the housing 330 in position to engage a screw 372 depending from the underside of each gear 9, Fig. 1. Either the screw, ring or both may be adjusted to predetermine the level to which the chuck will rise.

I claim:

1. The combination with a movable support having relatively movable mold carrying means thereon formed to receive molds of different sizes representing a diverse production of actuating means for moving said mold carrying means on said support and said support to index said mold carrying means from station to station, means for feeding clay charges varying in size and weight to the molds at some of said stations and means arranged to fabricate on the molds at other of the stations a diverse production from the charges of clay disposed on the molds.

2. The combination with a movable support having relatively movable mold carrying means mounted thereon of actuating means for moving said mold carrying means on said support and said support to index said mold carrying means from station to station, means for feeding clay to molds at one station, means arranged to fabricate ware on the molds at another station and means for removing filled molds from and placing empty molds on said mold carrying means at other stations.

3. The combination with a movable support having relatively movable mold carrying means mounted thereon of actuating means for moving said mold carrying means on said support and said support to index said mold carrying means from station to station, means for feeding clay to said molds at some of the stations, and means arranged to fabricate ware on the molds at other of the stations.

4. The combination with a movable support having relatively movable mold carrying means mounted thereon of actuating means for moving said mold carrying means on said support and said support to index said mold carrying means from station to station, means arranged to fabricate ware at some of the stations and means for transferring molds at other of the stations.

5. The combination with a movable support having relatively movable mold carrying means mounted thereon of actuating means for moving said mold carrying means on said support and said support to index said mold carrying means from station to station, means for feeding clay to the molds at some of said stations and means for transferring molds at other of said stations.

6. The combination with an angularly movable support having an angularly movable mold carrying means thereon of actuating means for angularly moving said mold carrying means on said support and said support to index said mold carrying means from station to station, means for feeding clay to molds at one station, means arranged to fabricate ware on the molds at another station and mold transferring apparatus at other of the stations.

7. The combination with an angularly movable support having an angularly movable mold carrier thereon of actuating means for angularly moving said mold carrying means and said support to index said mold carrying means from station to station, means for feeding clay to said molds at some of the stations, and means arranged to fabricate ware on the molds at other of the stations.

8. The combination with a rotatable support having a revolvable carrier thereon for receiving molds of means for revolving said carrier on its axis to index it from station to station as the support rotates, means for feeding clay to said molds at some of the stations, and means arranged to fabricate ware on the molds at other of the stations.

9. The combination with a rotatable support having a relatively and angularly movable mold carrier thereon of means for angularly moving said carrier on its axis and rotating the support to index the carrier from station to station and means for feeding clay to molds at some of said stations, and means arranged to fabricate ware on the molds at other of the stations.

10. The combination with a rotatable support having a relatively and angularly movable mold carrier thereon of means for angularly moving said carrier on its axis and means for rotating the support to index the carrier from station to station, means for feeding clay to molds at some of said stations, and means arranged to fabricate ware on the molds at other of the stations.

11. The combination with a rotatable support having a relatively and angularly movable mold carrier thereon of means for angularly moving said carrier thereon and moving said support to index the carrier from station to station, and means arranged to fabricate ware on the molds at one or more of the stations.

12. The combination with a rotatable support having a relatively and angularly movable mold carrier thereon of means for angularly moving said carrier on said support and means for moving said support to index the carrier from station to station, and means arranged to jigger clay on the molds at one of the stations.

13. The combination with a rotatable support having a relatively and angularly movable mold carrier thereon of means for angularly moving the carrier on the support and means for moving the support to index the carrier from station to station, and means at some of said stations for transferring molds.

14. The combination with a rotatable support having a plurality of revolvable carriers provided with seats for receiving molds, of a preforming means above each carrier rotatable with said support, jiggering means above each carrier rotatable with said support, stationary clay feeding means adjacent said support, mold transferring means, and means for revolving said carriers incident to rotation of said support to index the seats with said feeding, preforming, jiggering and mold transferring means.

15. The combination with a rotatable support having a plurality of revolvable carriers provided with seats for receiving molds, of a preforming means above each carrier rotatable with said support, jiggering means above each carrier rotatable with said support, stationary clay feeding means adjacent said support, means for intermittently rotating said support and means for revolving said carriers incident to rotation of said support to index the seats with said feeding, preforming and jiggering means.

16. The combination with a rotatable support having a plurality of revolvable carriers provided with seats for receiving molds, of a ware forming die above each carrier rotatable with a said support, jiggering means above each carrier rotatable with said support, clay feeding means adjacent said support, and means for revolving said carriers during the rotation of said support to index the seats with said feeder, die and jiggering means.

17. The combination with a rotatable support having a plurality of revolvable carriers provided with seats for receiving molds of a preforming means above each carrier rotatable with said support, clay feeding means adjacent said support, and means for revolving said carriers during the rotation of said support to index the seats with preforming and feeding means.

18. The combination with a rotatable support having a plurality of revlovable carriers provided with seats for receiving molds of a jiggering means above each carrier mounted to rotate with said support, clay feeding means adjacent said support, and means for revolving said carriers during the rotation of said support to index the seats with jiggering and feeding means.

19. The combination with a rotatable support having a plurality of revolvable carriers provided with mold seats of a preforming means above each carrier mounted to rotate with said support, mold transferring means, and means for revolving said carriers as they rotate with the support to thereby index the seats with preforming and mold transferring means.

20. The combination with a rotatable support having a plurality of revolvable carriers provided with mold seats of a preforming means above each carrier rotatable with said support, mold transferring means, clay feeding means and means for revolving said carriers during rotation of said support to index the seats with the preforming, clay feeding and mold transferring means.

21. The combination with a rotatable support having a plurality of revolvable carriers provided with mold seats of a jiggering means above each carrier rotatable with said support, mold transferring means and means for revolving said carriers during rotation of said support to index the seats with the jiggering and mold transferring means.

22. The combination with a movable support having a relatively movable mold carrier mounted thereon of actuating means for moving the carrier on the support and the support to index the carrier from station to station, means arranged to fabricate potteryware at some of the stations and mold lifters below said carrier at said fabricating stations for moving molds into cooperative relation with said fabricating means.

23. The combination with a movable support having a relatively movable mold carrier mounted thereon, of actuating means for moving the carrier on the support and the support to index the mold carrier from station to station, means for feeding clay to molds at one of said stations including means for progressing and means for cutting of charges of clay and mechanism for synchronizing the operation of the clay progressing and cutting off means with the movement of the support and carrier.

24. The combination with a rotatable support having a plurality of carriers for carrying a diverse group of molds, of means for rotating the support to index each carrier from station to station, means for feeding clay to the diverse molds at some of said stations including means for synchronizing the operation of the feeders at the different stations with the movement of the support and means for causing the feeders to operate successively to service the molds with charges that differ in size, shape, volume or some other essential characteristic, as required by a diversified production, and means arranged to fabricate diverse potteryware at other of said stations.

25. The combination with a rotatable support having a plurality of mold carriers of means for rotating the support to index each carrier from station to station, and means for feeding clay to molds at one of said stations including a nozzle and a cutter operating therebelow for slicing off charges of clay, a plurality of sources of supply of clay to be extruded through said nozzle, cut off and deposited on molds therebelow, and means operable when one source of supply becomes exhausted to start the movement of clay from another source of supply to the nozzle.

26. The combination with a rotatable support having a plurality of mold carriers revolvably mounted on the support of means for rotating the support and revolving the carriers to index the carriers from station to station and clay feeding means at one or more of said stations including a nozzle, mechanism for progressing clay through said nozzle, a cutter operating below said nozzle to slice off charges of clay to be deposited on molds therebelow and means for synchronizing the operation of the clay progressing means and the cutter with the movement of the support and carrier.

27. The combination specified in claim 26 including a timer for controlling the operation of the clay progressing means.

28. The combination with a rotatable support having a plurality of mold carriers revolvably mounted on the support of means for rotating the support and revolving the carriers to index the carriers from station to station, preforming means arranged to preform ware at some of said stations including dies mounted to rotate with said support, means for co-operating molds and dies when in register to perform preforming operations, means for rendering the dies substantially non-adhesive to clay and means for vertically adjusting said dies.

29. The combination with a rotatable support having a plurality of mold carriers revolvably mounted on the support means for rotating the support and revolving the carriers to index carriers from station to station and preforming means arranged to preform ware at some of said stations including dies mounted to rotate with said support, a mold lifter for co-operating molds and dies when in register and means for synchronizing the operation of the mold lifter with the movement of the support and carriers.

30. The combination with a rotatable support having a plurality of revolvable mold carriers thereon of means for rotating said support and revolving said carriers to index said carriers from station to station, and means arranged to fabricate ware on said molds at some of said stations including rotatable profiling means, above said carriers, means for lubricating the ware during profiling and mold elevating means operable to lift the molds into co-operation with said profiling means.

31. The combination with a rotatable support having a plurality of revolvable mold carriers thereon of means for rotating said support and revolving said carriers to index said carriers from station to station and means arranged to fabricate ware on said molds at some of said stations including rotatable profiles mounted for rotation with said support, and means for rotating said profiles including an automatically adjustable speed regulator and means for synchronizing the operation of the regulator with the movement of the support.

32. The combination with a rotatable support having a plurality of revolvable mold carriers thereon of means for rotating said support and revolving said carriers to index said carriers from station to station and means arranged for fabricating ware on said molds at some of said stations rotatable with said support including jiggering means and ware lubricating means, the latter operable to supply measured amounts of lubricant to the ware undergoing jiggering and having a timer for controlling the operation thereof.

33. The combination with a rotatable support having a plurality of revolvable mold carriers thereon of means for rotating said support and revolving said carriers to index said carriers from station to station and means arranged to fabricate ware on said molds at one of said stations rotatable with said support including rotatable jiggering means including ware lubricating means and means for intermittently operating said lubricating means.

34. The combination with a rotatable support having a plurality of revolvable mold carriers thereon of means for rotating said support and revolving said carriers to index said carriers from station to station and means rotatable with said support for fabricating ware on said molds including a rotatable jigger tool and a housing surrounding the tool having a side outlet through which scrap clay is ejected by the jigger tool.

35. The combination with a rotatable support having a plurality of revolvable mold carriers thereon of means for rotating said support and revolving said carriers to index said carriers from station to station and a mold conveyor formed for setting empty molds upon said carriers and lifting loaded molds therefrom and carrying them away.

36. The combination with a rotatable support having revolvable mold carriers thereon of means for rotating said support and revolving said carriers to move said carriers from station to station, means arranged to feed clay to and form ware on said molds at some of said stations and means formed for setting empty molds on and removing filled molds from said carriers at other of said stations.

WILLIAM J. MILLER.